(12) United States Patent
Suda et al.

(10) Patent No.: US 11,485,655 B2
(45) Date of Patent: Nov. 1, 2022

(54) WATER TREATMENT CONTROL SYSTEM

(71) Applicant: Mitsubishi Electric Corporation, Chiyoda-ku (JP)

(72) Inventors: Takumi Suda, Tokyo (JP); Nozomu Yasunaga, Tokyo (JP); Eiji Imamura, Tokyo (JP); Yoshifumi Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 202 days.

(21) Appl. No.: 16/620,255

(22) PCT Filed: May 17, 2018

(86) PCT No.: PCT/JP2018/019180
§ 371 (c)(1),
(2) Date: Dec. 6, 2019

(87) PCT Pub. No.: WO2019/039008
PCT Pub. Date: Feb. 28, 2019

(65) Prior Publication Data
US 2020/0172419 A1    Jun. 4, 2020

(30) Foreign Application Priority Data

Aug. 24, 2017  (JP) .............................. JP2017-161203

(51) Int. Cl.
*C02F 3/12*    (2006.01)
*B01D 65/02*    (2006.01)
(Continued)

(52) U.S. Cl.
CPC ............ *C02F 3/1268* (2013.01); *B01D 65/02* (2013.01); *B01D 65/08* (2013.01); *C02F 3/006* (2013.01);
(Continued)

(58) Field of Classification Search
CPC .............. B01D 2321/185; B01D 61/22; B01D 2315/06; B01D 2311/04;
(Continued)

(56) References Cited

U.S. PATENT DOCUMENTS

2015/0353397 A1* 12/2015 Cath ..................... C02F 3/2853
                                                        210/195.1
2019/0043230 A1    2/2019 Nagata et al.

FOREIGN PATENT DOCUMENTS

JP    2010-194481 A    9/2010
JP    2010-196843 A    9/2010
(Continued)

OTHER PUBLICATIONS

International Search Report dated Jul. 17, 2018 in PCT/JP2018/019180 filed May 17, 2018, citing documents AO and AR-AT therein, 2 pages.
(Continued)

*Primary Examiner* — Claire A Norris
(74) *Attorney, Agent, or Firm* — Xsensus LLP

(57) ABSTRACT

A water treatment control system includes an aerobic tank in which aerobic treatment is carried out, an aerobic tank aeration device that aerates to-be-treated water in the aerobic tank, a membrane filtration tank including a separation membrane that filters the to-be-treated water treated in the aerobic tank, a membrane filtration tank measurement instrument that measures the ammonia concentration of the to-be-treated water in the membrane filtration tank, as a membrane filtration tank ammonia concentration measurement value, and an aerobic tank aeration air volume calculation device that sets the aerobic tank aeration air volume of the aerobic tank aeration device on the basis of the membrane filtration tank ammonia concentration measurement value.

3 Claims, 6 Drawing Sheets

(51) Int. Cl.
  *B01D 65/08* (2006.01)
  *C02F 3/00* (2006.01)

(52) U.S. Cl.
  CPC ...... *C02F 3/1278* (2013.01); *B01D 2321/185* (2013.01); *C02F 2209/14* (2013.01); *C02F 2209/38* (2013.01); *C02F 2303/16* (2013.01)

(58) Field of Classification Search
  CPC ..... B01D 2311/2665; B01D 2311/2688; C02F 3/1268; C02F 3/006; C02F 3/1278; C02F 3/1273; C02F 3/303; C02F 2209/14; C02F 2209/38; C02F 2209/006; C02F 2303/16; C02F 2303/20; C02F 1/008; G01N 33/188; G01N 33/18
  USPC ........................................................ 210/96.2
  See application file for complete search history.

(56) References Cited

FOREIGN PATENT DOCUMENTS

| | | |
|---|---|---|
| JP | 2012-76081 A | 4/2012 |
| JP | 2015-27659 A | 2/2015 |
| JP | 2015-127027 A | 7/2015 |
| WO | WO 2017/158926 A9 | 9/2017 |

OTHER PUBLICATIONS

Notice of Reasons for Refusal dated Oct. 29, 2019 in Japanese Application No. 2019-537923, citing documents AO and AR-AT therein, 6 pages (with English translation).
Office Action dated Sep. 28, 2021 in Chinese Patent Application No. 201880053742.7, 11 pages.

* cited by examiner

WATER TREATMENT CONTROL SYSTEM

FIELD

The present invention relates to a water treatment control system including an aerobic tank to aerobically treat water by microorganisms, and a membrane filtration tank to carry out solid-liquid separation on the water, using a membrane separation device.

BACKGROUND

One known method for treating sewage such as domestic wastewater is an aerobic organism treatment technology in which wastewater and activated sludge are mixed together, and the mixture is then air blown (aeration process), thus allowing bacteria to adsorb and biodegrade organic matter in the water. Urea, which is one of the organic matter to be treated, is degraded to ammonia by urease, which is a urea-degrading enzyme. Moreover, ammonia is oxidized into nitrite ions or to nitrate ions by nitrifying bacteria. This process is called nitrification. As urease and nitrifying bacteria consume oxygen consumption during degradation and/or nitrification of sludge, a required amount of dissolved oxygen needs to be supplied by aeration of the aerobic tank using a blower.

In addition, a membrane separation activated sludge method is used as one sewage treatment method, in which a separation membrane is used to perform membrane filtration to carry out solid-liquid separation on the sludge in the water. For the membrane separation activated sludge method, contaminants adheres to the surface and inside pores of the separation membrane as a result of continued use of the separation membrane, thereby causing clogging (fouling) in which case filtration performance will be gradually reduced. As a method for reducing such fouling, aeration is performed from under the separation membrane, using a blower to remove the material adhered to the surface of the separation membrane by means of bubbles and an updraft of the to-be-treated water.

CITATION LIST

Patent Literature

Patent Literature 1: Japanese Patent Application Laid-open No. 2015-127027

SUMMARY

Technical Problem

Cost of energy required for aeration by the blower for the aerobic tank and by the blower under the separation membrane described above amounts to about half of the total operational cost, and a technique for reducing the amount of aeration has been developed to reduce the amount of operational energy. In addition, contaminants adhered to and/or deposited on the surface and inside pores of the separation membrane include microorganisms such as bacteria and nitrifying bacteria. These microorganisms grow by feeding on ammonia and/or the like, which may cause fouling. At an advanced stage of fouling, it may be necessary to not only remove material adhered to the surface and inside pores of the separation membrane by aeration, but also clean the separation membrane, using ozone water.

Patent Literature 1 listed above considers a technology for reducing the amount of operational energy of aeration of the aerobic tank and of the separation membrane after reducing the ammonia concentration of the treated water, but considers neither a technology for controlling the ammonia concentration of the treated water in the membrane filtration tank such that the ammonia concentration becomes a target value, nor a technology for reducing the amount of operational energy of aeration on the separation membrane and the amount of energy consumed by cleaning of the separation membrane.

The present invention has been made to solve the problems as described above, and it is an object of the present invention to reduce the amount of energy needed for aeration in a water treatment control system, and to reduce or prevent growth of nitrifying bacteria adhered to and/or deposited on the surface and inside pores of the separation membrane.

Solution to Problem

A water treatment control system according to this invention comprises: an aerobic tank in which aerobic treatment is carried out; an aerobic tank aeration device to aerate to-be-treated water in the aerobic tank; a membrane filtration tank including a separation membrane to filter the to-be-treated water treated in the aerobic tank; a membrane filtration tank measurement instrument to measure an ammonia concentration of the to-be-treated water in the membrane filtration tank, as a membrane filtration tank ammonia concentration measurement value; and an aerobic tank aeration air volume calculation device to set an aerobic tank aeration air volume of the aerobic tank aeration device on a basis of the membrane filtration tank ammonia concentration measurement value.

Advantageous Effects of Invention

A water treatment control system according to this invention is capable of reducing an excessive aeration air volume in an aerobic tank, and of reducing or preventing progression of fouling by reducing the ammonia concentration in the membrane filtration tank, thereby inhibiting growth of nitrifying bacteria adhered to and/or deposited on the surface and inside pores of the separation membrane.

DESCRIPTION OF EMBODIMENTS

First Embodiment

A water treatment control system 100 according to a first embodiment of the present invention will now be described with reference to the configuration diagram of the water treatment control system 100 illustrated in FIG. 1.

Figure 1:
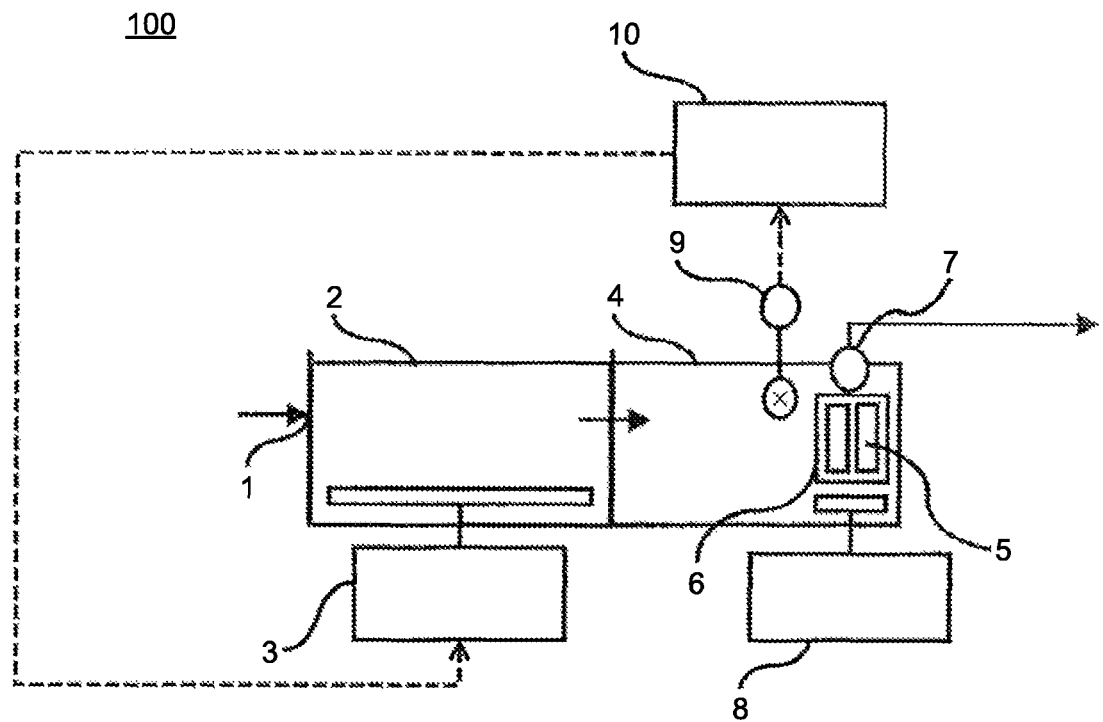
FIG. 1 is a configuration diagram of a water treatment control system according to a first embodiment of the present invention.

As illustrated in FIG. 1, the water treatment control system 100 according to the first embodiment includes an inlet 1, an aerobic tank 2, an aerobic tank aeration device 3, a membrane filtration tank 4, a separation membrane 5, a membrane filtration device 6, a treated-water discharge device 7, a membrane surface aeration device 8, a membrane filtration tank measurement instrument 9, and an aerobic tank aeration air volume calculation device 10.

Sludge water flows from the inlet 1 into the aerobic tank 2. Aerobic treatment is performed in the aerobic tank 2. The sludge water having flowed into the aerobic tank 2 is "to-be-treated water" that will be treated as discussed hereinbelow. The to-be-treated water is nitrified by nitrifying bacteria in the aerobic tank 2. As used herein, the term "nitrification" refers to transforming ammonia into nitrate such as nitrite ions or nitrate ions. In the aerobic tank 2, nitrifying bacteria consume dissolved oxygen in the aerobic tank 2 to perform nitrification.

The aerobic tank aeration device 3 is provided for the aerobic tank 2. The aerobic tank aeration device 3 aerates the to-be-treated water in the aerobic tank 2. Aerating the to-be-treated water in the aerobic tank 2 increases the dissolved oxygen concentration of the to-be-treated water in the aerobic tank 2. The aerobic tank aeration device 3 aerates the to-be-treated water in the aerobic tank 2 at an airflow rate (hereinafter referred to as "aerobic tank aeration air volume") that is set by an aerobic tank aeration air volume output from the aerobic tank aeration air volume calculation device 10 described later herein. A set value of the aerobic tank aeration air volume that is output from the aerobic tank aeration air volume calculation device 10 is hereinafter referred to as "aerobic tank aeration air volume control value Q". Thus, the amount of dissolved oxygen in the to-be-treated water in the aerobic tank 2 is controlled by the aerobic tank aeration air volume control value Q that is output from the aerobic tank aeration air volume calculation device 10.

The to-be-treated water having been nitrified in the aerobic tank 2 flows into the membrane filtration tank 4. The aerobic tank 2 and the membrane filtration tank 4 are separated from each other by a diaphragm. The to-be-treated water flows from the aerobic tank 2 into the membrane filtration tank 4 by overflowing. Alternatively, these tanks may be separated from each other as independent reaction tanks, and may use a pipe connecting these tanks together to allow the to-be-treated water to flow into the membrane filtration tank 4.

Figure 2:
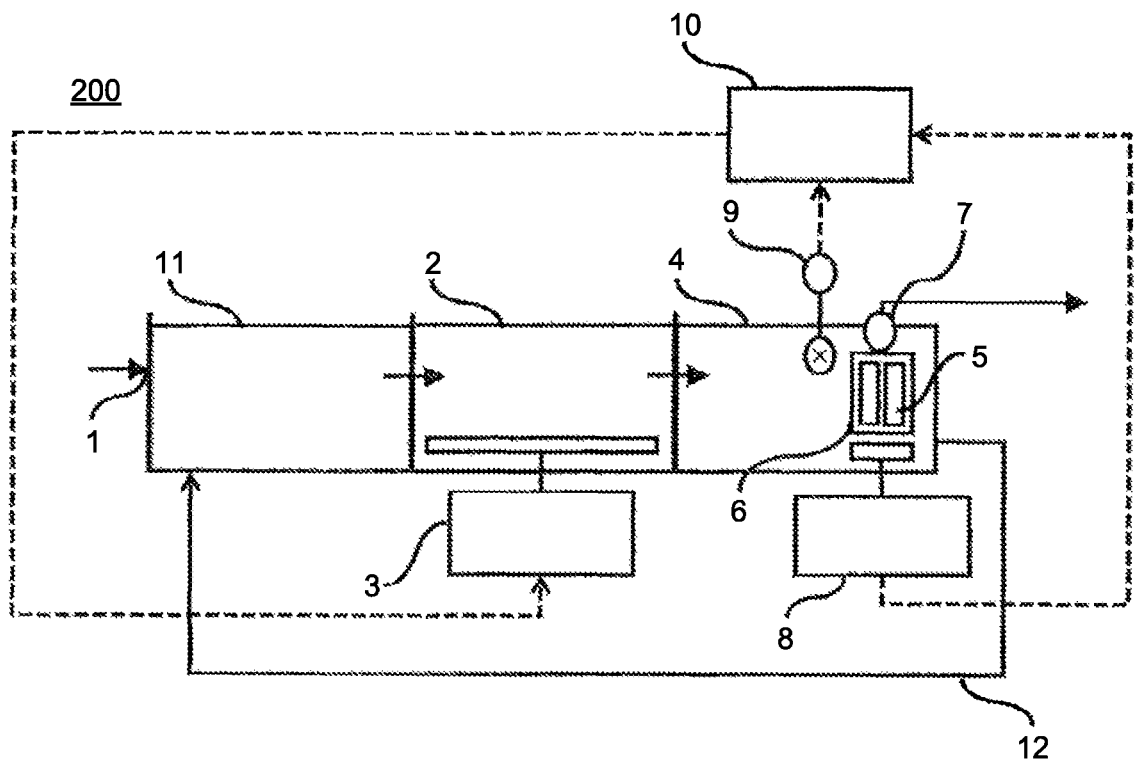
FIG. 2 is a configuration diagram of an application example of the water treatment control system according to the first embodiment of the present invention.

Note that the water treatment control system 100 configured as illustrated in FIG. 1 does not treat the nitrate generated by the nitrification in the aerobic tank 2, but as illustrated in the configuration diagram of a water treatment control system 200 illustrated in FIG. 2, an anoxic tank 11 and a sludge return device 12 are provided upstream of the aerobic tank 2. The anoxic tank 11 performs only agitation without aeration. The sludge return device 12 returns the sludge from the membrane filtration tank 4 to the anoxic tank 11. Providing the anoxic tank 11 and the sludge return device 12 allows anaerobic microorganisms in the anoxic tank 11 to make respiration stripping nitrogen of oxygen, thereby providing reduction treatment (denitrification treatment), in which nitrite ions and nitrate ions are released to the air in the form of nitrogen gas.

In the membrane filtration tank 4, solid-liquid separation is carried out on the to-be-treated water having flowed from the aerobic tank 2 thereinto. The term "solid-liquid separation" refers to a process of separating solids that is mixed in liquid. The membrane filtration tank 4 includes the membrane filtration device 6 having the separation membrane 5 for removing, for example, organic matter by solid-liquid separation, and the treated-water discharge device 7 that feeds the treated water to the next stage. The to-be-treated water is pressure-fed using, for example, a pump, toward the separation membrane 5 of the membrane filtration device 6 to thereby remove contaminants, thus achieving the solid-liquid separation in the membrane filtration tank 4. In the membrane filtration tank 4, the to-be-treated water having flowed from the aerobic tank 2 is treated to have contaminants removed through the membrane filtration device 6 to thereby transform into treated water, and such treated water is then fed to the next stage by the treated-water discharge device 7.

Fouling of the separation membrane 5 is caused by adhesion and/or deposition of the contaminants removed by the solid-liquid separation, on the surface and inside pores of the separation membrane 5. Nitrifying bacteria adhered to and/or deposited on the surface and inside pores of the separation membrane 5 repeats division and growth by feeding on ammonia in the to-be-treated water in the membrane filtration tank 4. Fouling of the separation membrane 5 is caused by such repetition of the division and growth of nitrifying bacteria, in addition to by the adhesion and/or deposition of contaminants. To prevent progression of fouling, the membrane surface aeration device 8 disposed under the separation membrane 5 carries out membrane surface aeration on the to-be-treated water in the membrane filtration tank 4 to allow bubbles and an updraft of the to-be-treated water in the membrane filtration tank 4 to remove the material adhered to the surface and inside pores of the separation membrane 5. However, continued solid-liquid separation by the separation membrane 5 results in failure to remove all contaminants adhered to and/or deposited on the separation membrane 5 only by an operation of removing adhered material using membrane surface aeration. Accordingly, ozone water, hypochlorous acid, or the like is used to backwash the separation membrane 5 from the side same as the treated-water discharge device of the membrane filtration tank 4. Backwashing discharges contaminants adhered to and/or deposited on the surface and inside pores of the separation membrane 5, and kills nitrifying bacteria adhered to and/or deposited on the surface and inside pores of the separation membrane 5. The separation membrane 5 is thus cleaned. Backwashing of the separation membrane 5 is performed periodically. Note that the membrane surface aeration on the separation membrane 5 causes nitrification also in the membrane filtration tank 4, which reduces the ammonia concentration of the to-be-treated water in the membrane filtration tank 4.

The membrane filtration tank measurement instrument 9 is provided in the membrane filtration tank 4, and measures the membrane filtration tank ammonia concentration, i.e., the ammonia concentration of the to-be-treated water in the membrane filtration tank 4. The value of the membrane filtration tank ammonia concentration that has been measured is hereinafter referred to as "membrane filtration tank ammonia concentration measurement value F".

The aerobic tank aeration air volume calculation device 10 includes, in addition to a central processing unit (CPU), a read-only memory (ROM), a random access memory (RAM), an interface (I/F), an input-output (I/O) port, and the like (neither illustrated). The ROM stores programs executed by the CPU, various constant data, and the like. The programs executed by the CPU can be stored in various types of storage media such as a flexible disk, a compact disc (CD)-ROM, and/or a memory card, and are installed in the ROM from these storage media. The RAM temporarily stores data required for execution of the programs. The I/F sends and receives data with external devices (e.g., the aerobic tank aeration device 3, the membrane filtration tank measurement instrument 9, etc.). The I/O port inputs and outputs detection signals of various sensors.

The aerobic tank aeration air volume calculation device 10 calculates the aerobic tank aeration air volume control value Q on the basis of the membrane filtration tank ammonia concentration measurement value F measured in the membrane filtration tank measurement instrument 9. The aerobic tank aeration air volume control value Q, which is the aerobic tank aeration air volume in the aerobic tank 2, is required to control the ammonia concentration of the to-be-treated water in the membrane filtration tank 4 such that the ammonia concentration of the to-be-treated water in the membrane filtration tank 4 is brought to a target value T (hereinafter referred to as "membrane filtration tank ammonia concentration target value T"). The aerobic tank aeration air volume calculation device 10 outputs the calculated aerobic tank aeration air volume control value to the aerobic tank aeration device 3. Note that a detailed method of calculating the aerobic tank aeration air volume control value Q will be described in detail later.

An operation of the water treatment control system 100 according to the first embodiment of the present invention will now be described. In the water treatment control system 100 according to the first embodiment, sludge water flows from the inlet 1 into the aerobic tank 2. The sludge water having flowed into the aerobic tank 2, which is the to-be-treated water in the aerobic tank 2, has ammonia nitrified by aeration of the aerobic tank aeration device 3, thereby reducing the ammonia concentration. The to-be-treated water in the aerobic tank 2 overflows into the membrane filtration tank 4. The to-be-treated water in the membrane filtration tank 4 that has flowed into the membrane filtration tank 4 has contaminant removed by solid-liquid separation by the separation membrane 5 of the membrane filtration device 6. The ammonia concentration of the to-be-treated water in the membrane filtration tank 4 is reduced due to the nitrification effect provided by the membrane surface aeration performed by the membrane surface aeration device 8 on the separation membrane 5. The to-be-treated water having the ammonia concentration thus reduced is then fed, as the treated water, to the next stage by the treated-water discharge device 7.

Note that the aerobic tank aeration air volume to be produced by the aerobic tank aeration device 3 is set by the aerobic tank aeration air volume control value Q calculated in the aerobic tank aeration air volume calculation device 10.

Figure 3:
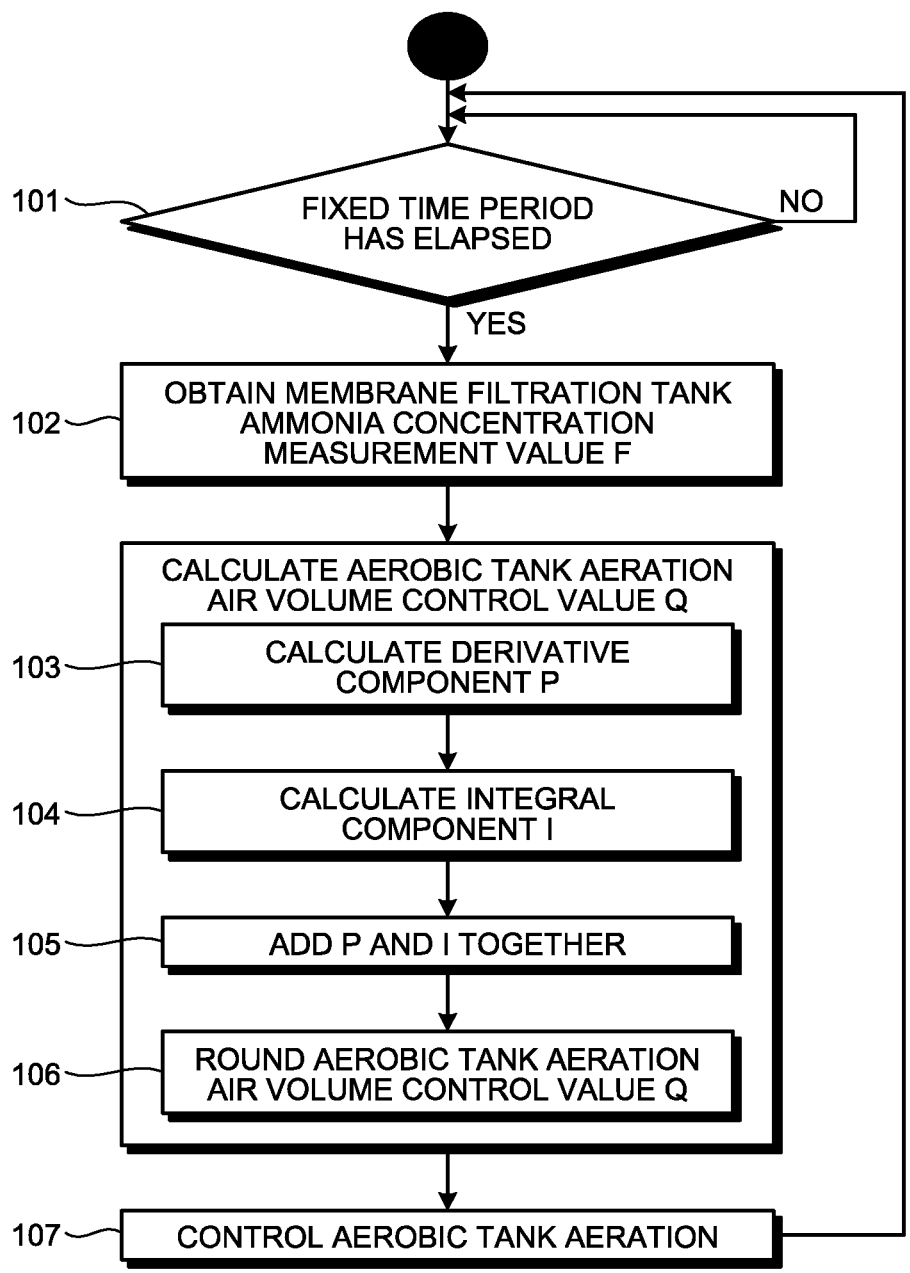
FIG. 3 is a control flow chart according to the first embodiment of the present invention.

A control procedure by the water treatment control system 100 according to the first embodiment of the present invention will now be described with reference to the control flow chart of FIG. 3. The control is performed at fixed time intervals. Note that the processing at steps 101 to 107 is performed in the aerobic tank aeration air volume calculation device 10.

At step 101, the control starts when a predetermined fixed time period (hereinafter referred to as "control period") has elapsed.

At step 102, the membrane filtration tank ammonia concentration measurement value F is measured by the membrane filtration tank measurement instrument 9, and the membrane filtration tank ammonia concentration measurement value F that has been measured is sent to the aerobic tank aeration air volume calculation device 10.

In order that the ammonia concentration of the to-be-treated water in the membrane filtration tank 4 is brought to the membrane filtration tank ammonia concentration target value T under feedback control such as PI control, the aerobic tank aeration air volume calculation device 10 calculates the aerobic tank aeration air volume control value Q for setting the aerobic tank aeration air volume provided by the aerobic tank aeration device 3.

At step 103, as given by formula (1) below, the aerobic tank aeration air volume calculation device 10 calculates the difference between the membrane filtration tank ammonia concentration measurement value F that has been measured by the membrane filtration tank measurement instrument 9 and the predetermined membrane filtration tank ammonia concentration target value T, and multiplies this difference by a factor Kp of the proportional term, thus obtaining the product as the proportional component P.

$$P = Kp \times \{(\text{Membrane filtration tank ammonia concentration measurement value } F) - (\text{Membrane filtration tank ammonia concentration target value } T)\} \quad (1)$$

At step 104, as given by formula (2) below, the aerobic tank aeration air volume calculation device 10 calculates the difference between the membrane filtration tank ammonia concentration measurement value F that has been measured by the membrane filtration tank measurement instrument 9 and the predetermined membrane filtration tank ammonia concentration target value T, and multiplies the integral of the difference by a factor Ki of the integral term, thus to obtain the product as the integral component I.

$$I = Ki \times \int \{(\text{Membrane filtration tank ammonia concentration measurement value } F) - (\text{Membrane filtration tank ammonia concentration target value } T)\} dt \quad (2)$$

The water treatment control system 100 according to the first embodiment uses, as one example, a simple manner of calculation to calculate the difference between the membrane filtration tank ammonia concentration measurement value F that has been measured by the membrane filtration tank measurement instrument 9 and the predetermined membrane filtration tank ammonia concentration target value T, and then time-integrate the difference every control period.

The factors Kp and Ki are tuned on the basis of environmental factors such as the tank structure, the inflow fluid quality, and/or the bubble diameter in aeration. In the water treatment control system 100 according to the first embodiment uses, the values of Kp and Ki are, by way of example, 4,000 and 100, respectively (Kp=4,000 and Ki=100).

At step 105, as given by formula (3) below, the aerobic tank aeration air volume calculation device 10 adds together the proportional component P and the integral component I calculated, to calculate the aerobic tank aeration air volume control value Q for controlling the ammonia concentration of the to-be-treated water in the membrane filtration tank 4 such that the ammonia concentration of the to-be-treated water in the membrane filtration tank 4 is brought to the membrane filtration tank ammonia concentration target value T.

$$\text{(Aerobic tank aeration air volume control value } Q) = \text{(Proportional component } P) + \text{(Integral component } I) \quad (3)$$

At step 106, in a case in which the aerobic tank aeration air volume control value Q has been calculated as diverging to exceed an upper limit of the output capacity of the aerobic tank aeration device 3, the aerobic tank aeration air volume calculation device 10 rounds the aerobic tank aeration air volume control value Q down to the upper limit. Similarly for a lower limit, in a case in which the aerobic tank aeration air volume control value Q that has been calculated is a negative value, or falls below a lower limit of the output capacity of the aerobic tank aeration device 3, the aerobic tank aeration air volume calculation device 10 rounds the aerobic tank aeration air volume control value Q up to the lower limit. In the water treatment control system 100 according to the first embodiment uses, a value of the upper limit and a value of the lower limit are, by way of example, 100,000 and 100, respectively ([upper limit value]=100,000 and [lower limit value]=100).

At step 107, the aerobic tank aeration air volume calculation device 10 sends the aerobic tank aeration air volume control value Q calculated in the processing at steps 101 to 106, from the aerobic tank aeration air volume calculation device 10 to the aerobic tank aeration device 3. The aerobic tank aeration device 3 carries out aeration of the to-be-treated water in the aerobic tank 2 at the aerobic tank aeration air volume control value Q received. After the processing at step 107, the process returns back to step 101, and the control procedure is kept waiting until the fixed time period elapses.

In the water treatment control system 100 according to the first embodiment, in a case in which the membrane filtration tank ammonia concentration measurement value F measured by the membrane filtration tank measurement instrument 9 is greater than the membrane filtration tank ammonia concentration target value T, the aerobic tank aeration air volume control value Q calculated in the aerobic tank aeration air volume calculation device 10 is set to an aeration air volume greater than the aerobic tank aeration air volume at the time the membrane filtration tank ammonia concentration measurement value F greater than the membrane filtration tank ammonia concentration target value T is measured. The aerobic tank aeration air volume control value Q is output to the aerobic tank aeration device 3, and the aerobic tank aeration device 3 then carries out aeration on the to-be-treated water in the aerobic tank 2 at the aerobic tank aeration air volume control value Q received. An increase in the aerobic tank aeration air volume results in an increase in the amount of dissolved oxygen DO in the to-be-treated water in the aerobic tank 2. Nitrifying bacteria present in the to-be-treated water in the aerobic tank 2 consume the dissolved oxygen to nitrify ammonia, which brings the ammonia concentration of the to-be-treated water in the membrane filtration tank 4 close to the membrane filtration tank ammonia concentration target value T. Otherwise, in a case in which the membrane filtration tank ammonia concentration measurement value F measured by the membrane filtration tank measurement instrument 9 is less than the membrane filtration tank ammonia concentration target value T, the aerobic tank aeration air volume control value Q calculated in the aerobic tank aeration air volume calculation device 10 is set to a value less than the aerobic tank aeration air volume at the time the membrane filtration tank ammonia concentration measurement value F less than the membrane filtration tank ammonia concentration target value T is measured.

The water treatment control system 100 according to the first embodiment allows the membrane filtration tank measurement instrument 9 to measure the ammonia concentration of the to-be-treated water in the membrane filtration tank 4 as the membrane filtration tank ammonia concentration measurement value F, and controls the aeration air volume in the aerobic tank 2 on the basis of the membrane filtration tank ammonia concentration measurement value F such that the ammonia concentration of the to-be-treated water in the membrane filtration tank 4 is maintained at the membrane filtration tank ammonia concentration target value T. Controlling the aeration air volume in the aerobic tank 2 to maintain the ammonia concentration in the membrane filtration tank 4 at the membrane filtration tank ammonia concentration target value T can reduce or eliminate the likelihood that nitrifying bacteria adhered to and/or deposited on the surface and inside pores of the separation membrane 5 grows by its division. This can prevent progression of fouling of the separation membrane 5, and can thus reduce operational cost of the water treatment control system.

In addition, optimally controlling the aeration air volume in the aerobic tank 2 on the basis of the ammonia concentration of the to-be-treated water in the membrane filtration tank 4 can prevent excessive aeration in the aerobic tank 2. This can reduce the amount of energy needed for aeration, and can thus reduce operational cost of the water treatment control system.

Second Embodiment

Figure 4:
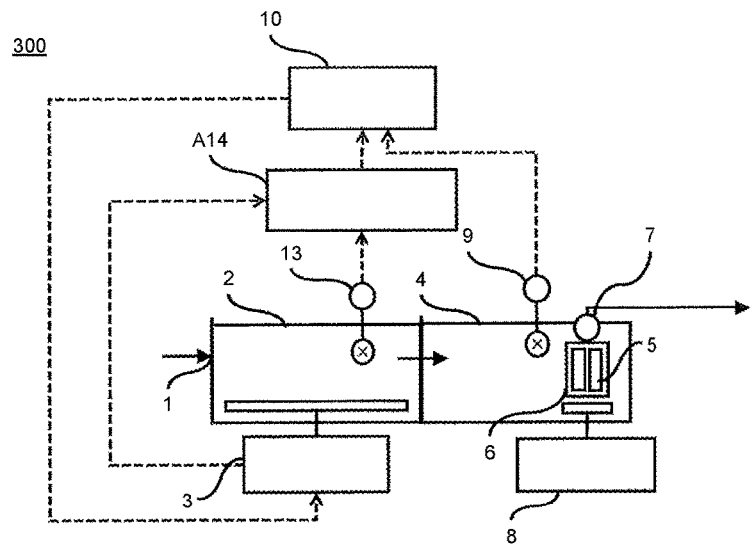
FIG. 4 is a configuration diagram of a water treatment control system according to a second embodiment of the present invention.

A water treatment control system 300 according to a second embodiment of the present invention will now be described with reference to the configuration diagram of FIG. 4. Note that in FIG. 4, like reference characters as in FIG. 1 designate identical or corresponding elements. Thus, a description thereof will be omitted, and a description will be given of portions configured differently from the water treatment control system 100 of the first embodiment. The water treatment control system 300 according to the second embodiment of the present invention includes, in addition to the components of the water treatment control system 100 according to the first embodiment, an aerobic tank measurement instrument 13 and an aerobic tank aeration air volume offset calculation device A14. Note that the aerobic tank aeration device 3 has a function of measuring the aerobic tank aeration air volume, i.e., the aeration air volume in the aerobic tank 2, and sending the aerobic tank aeration air volume to the aerobic tank aeration air volume offset calculation device A14. The aerobic tank aeration air volume that has been measured is hereinafter referred to as "aerobic tank aeration air volume measurement value Vb".

The aerobic tank measurement instrument 13 is provided in the aerobic tank 2 to measure the aerobic tank ammonia concentration, i.e., the ammonia concentration of the to-be-treated water in the aerobic tank 2. The aerobic tank ammonia concentration that has been measured is hereinafter referred to as "aerobic tank ammonia concentration measurement value Aa".

The aerobic tank aeration air volume offset calculation device A14 includes, in addition to a central processing unit (CPU), a read-only memory (ROM), a random access memory (RAM), an interface (I/F), an input-output (I/O) port, and the like (neither illustrated). The ROM stores programs executed by the CPU, various constant data, and the like. The programs executed by the CPU can be stored in various types of storage media such as a flexible disk, a CD-ROM, and/or a memory card, and are installed in the ROM from these storage media. The RAM temporarily stores data required for execution of the programs. The I/F sends and receives data with external devices (e.g., the aerobic tank aeration device 3 and the aerobic tank measurement instrument 13). The I/O port inputs and outputs detection signals of various sensors.

On the basis of: the aerobic tank aeration air volume measurement value Vb measured in the aerobic tank aeration device 3; and the aerobic tank ammonia concentration measurement value Aa measured in the aerobic tank measurement instrument 13, the aerobic tank aeration air volume offset calculation device A14 calculates an offset value Oa of the aerobic tank aeration air volume for the ammonia concentration of the to-be-treated water in the aerobic tank 2 (the offset value hereinafter referred to as "aerobic tank aeration air volume offset value Oa"). The aerobic tank aeration air volume offset calculation device A14 then outputs the aerobic tank aeration air volume offset value Oa to the aerobic tank aeration air volume calculation device 10. Note that a detailed method of calculating the aerobic tank aeration air volume offset value Oa will be described in detail later.

As given by formula (4) below, the aerobic tank aeration air volume calculation device 10 subtracts the aerobic tank aeration air volume offset value Oa calculated in the aerobic tank aeration air volume offset calculation device A14, from the aerobic tank aeration air volume control value Q calculated by control similar to the control in the control flow of the first embodiment (steps 102 to 105 of FIG. 3) to thereby calculate an aerobic tank aeration air volume Xa in the aerobic tank 2. The aerobic tank aeration air volume Xa is required to control the ammonia concentration of the to-be-treated water in the membrane filtration tank 4 such that the ammonia concentration of the to-be-treated water in the membrane filtration tank 4 is brought to the membrane filtration tank ammonia concentration target value T. The aerobic tank aeration air volume Xa is hereinafter referred to as "aerobic tank aeration air volume control corrected value Xa". The aerobic tank aeration air volume calculation device 10 then outputs the aerobic tank aeration air volume control corrected value Xa to the aerobic tank aeration device 3.

(Aerobic tank aeration air volume control corrected value $Xa$)=(Aerobic tank aeration air volume control value $Q$)−(Aerobic tank aeration air volume offset value $Oa$)  (4)

An operation of the water treatment control system 300 according to the second embodiment of the present invention will now be described. Description of operation identical to the operation of the water treatment control system 100 according to the first embodiment of the present invention will be omitted, and only the different part of operation will be described below.

In the water treatment control system 300 according to the second embodiment of the present invention, the aerobic tank aeration air volume to be produced by the aerobic tank aeration device 3 is set by the aerobic tank aeration air volume control corrected value Xa. The aerobic tank aeration air volume control corrected value Xa is calculated by subtracting the aerobic tank aeration air volume offset value Oa calculated in the aerobic tank aeration air volume offset calculation device A14, from the aerobic tank aeration air volume control value Q calculated in the aerobic tank aeration air volume calculation device 10.

Figure 5:
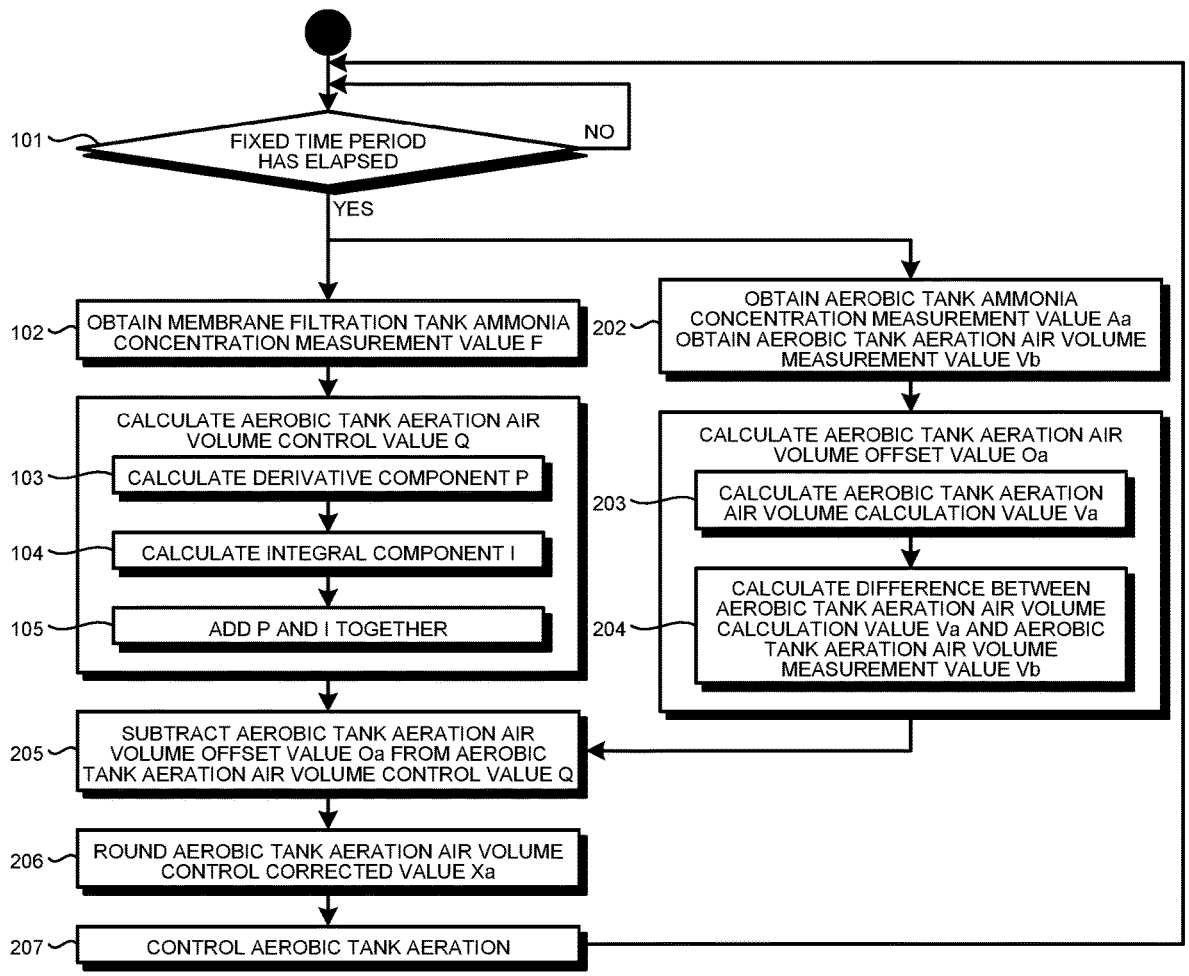
FIG. 5 is a control flow chart according to the second embodiment of the present invention.

A control procedure by the water treatment control system 300 according to the second embodiment of the present invention will now be described with reference to the control flow chart of FIG. 5. Note that only the part different from the control procedure by the water treatment control system 100 of the first embodiment will be described. The control is performed at fixed time intervals. At steps 101 to 105, similarly to the control procedure discussed in the first embodiment (steps 101 to 105 of FIG. 3), the aerobic tank aeration air volume calculation device 10 calculates the aerobic tank aeration air volume control value Q. Note that the processing at steps 101 to 105 is performed by the aerobic tank aeration air volume calculation device 10.

The processing at steps 202 to 204 is performed by the aerobic tank aeration air volume offset calculation device A14. At step 202, the aerobic tank aeration air volume offset calculation device A14 obtains the aerobic tank ammonia concentration measurement value Aa measured in the aerobic tank measurement instrument 13, and the aerobic tank aeration air volume measurement value Vb measured in the aerobic tank aeration device 3.

Figure 6:
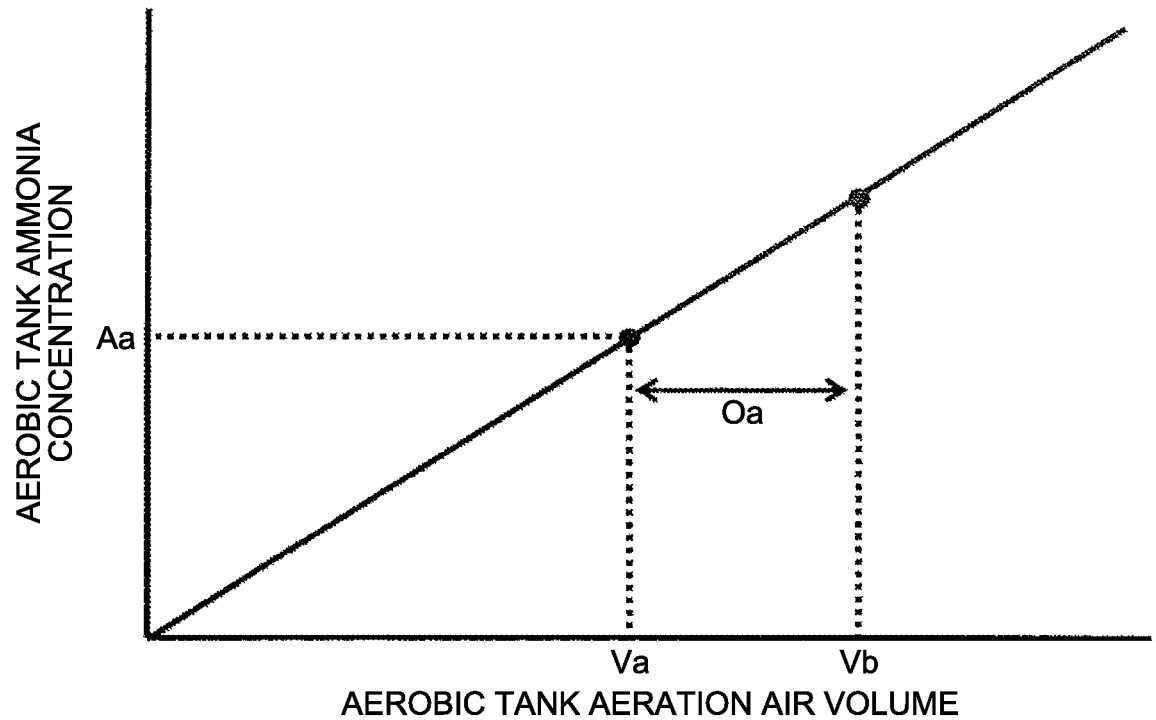
FIG. 6 is a relationship graph of the aerobic tank aeration air volume and the aerobic tank ammonia concentration according to the second embodiment of the present invention.

At step 203, the aerobic tank aeration air volume offset calculation device A14 calculates an aerobic tank aeration air volume calculation value Va on the basis of a relationship indicated by measured value data obtained by measurement of the relationship illustrated in FIG. 6 between the aerobic tank aeration air volume and the aerobic tank ammonia concentration that can be nitrified by that aerobic tank aeration air volume. The aerobic tank aeration air volume calculation value Va corresponds to the aerobic tank ammonia concentration measurement value Aa measured in the aerobic tank measurement instrument 13. The relationship illustrated in FIG. 6 may be obtained through preliminary measurement. In a case of performing preliminary measurement, the aerobic tank aeration air volume and the ammonia concentration of the to-be-treated water in the aerobic tank 2 are measured in the configuration of FIG. 4 to calculate the relationship of FIG. 6. The aeration air volume in the membrane filtration tank 4 is fixed to an arbitrary value, which is desirably as close to an actual value during operation as possible. The ammonia concentration of the sludge water flowed in through the inlet 1 is scanned in arbitrary increments or steps over the operational range to adjust the aerobic tank aeration air volume to bring the ammonia concentration of the to-be-treated water in the membrane filtration tank 4 to the membrane filtration tank ammonia concentration target value T in every step. The relationship of FIG. 6 can be obtained from the ammonia concentration in the aerobic tank 2 measured in every step and the adjusted aerobic tank aeration air volume.

At step 204, as given by formula (5) below, the aerobic tank aeration air volume offset calculation device A14 calculates the difference between the aerobic tank aeration air volume calculation value Va calculated at step 203 and the aerobic tank aeration air volume measurement value Vb measured in the aerobic tank aeration device 3 to thereby calculate the aerobic tank aeration air volume offset value Oa for the ammonia concentration of the to-be-treated water in the aerobic tank 2.

(Aerobic tank aeration air volume offset value $Oa$)= (Aerobic tank aeration air volume measurement value $Vb$)−(Aerobic tank aeration air volume calculation value $Va$)  (5)

In the case illustrated in FIG. 6, the aerobic tank aeration air volume measurement value Vb measured in the aerobic tank aeration device 3 is greater than the value corresponding to the aerobic tank ammonia concentration measurement value Aa measured in the aerobic tank measurement instrument 13. Thus, the aerobic tank aeration air volume offset value Oa is a positive value.

The aerobic tank aeration air volume offset calculation device A14 sends the aerobic tank aeration air volume offset value Oa calculated at step 204 to the aerobic tank aeration air volume calculation device 10.

At step 205, as given by formula (4), the aerobic tank aeration air volume calculation device 10 subtracts the aerobic tank aeration air volume offset value Oa calculated in the aerobic tank aeration air volume offset calculation device A14, from the aerobic tank aeration air volume control value Q calculated at steps 102 to 105 to thereby calculate the aerobic tank aeration air volume control corrected value Xa in the aerobic tank 2. The aerobic tank aeration air volume control corrected value Xa is required to control the ammonia concentration of the to-be-treated water in the membrane filtration tank 4 such that the ammonia concentration of the to-be-treated water in the membrane filtration tank 4 is brought to the membrane filtration tank ammonia concentration target value T.

At step 206, the aerobic tank aeration air volume calculation device 10 rounds the aerobic tank aeration air volume control corrected value Xa calculated, to an upper or lower limit similarly to the operation of the first embodiment. In the water treatment control system 300 according to the second embodiment uses, a value of the upper limit and a value of the lower limit are, for example, 100,000 and 100, respectively ([upper limit value]=100,000 and [lower limit value]=100).

At step 207, the aerobic tank aeration air volume calculation device 10 sends, to the aerobic tank aeration device 3, the rounded aerobic tank aeration air volume control corrected value Xa that is the finalized control value. The aerobic tank aeration device 3 carries out aeration on the to-be-treated water in the aerobic tank 2 at the aerobic tank aeration air volume control corrected value Xa received. After the processing at step 207, the process returns back to step 101, and the flow is kept waiting until the fixed time period elapses.

The water treatment control system 300 according to the second embodiment calculates the aerobic tank aeration air volume calculation value, i.e., the aerobic tank aeration air volume on the basis of measured value data obtained by measurement of the relationship between the aerobic tank aeration air volume and the aerobic tank ammonia concentration. The aerobic tank aeration air volume corresponds to the aerobic tank ammonia concentration measurement value. The water treatment control system 300 subtracts the aerobic tank aeration air volume calculation value from the aerobic tank aeration air volume measurement value to thereby calculate the aerobic tank aeration air volume offset value. The water treatment control system 300 calculates the aerobic tank aeration air volume control value on the basis of the membrane filtration tank ammonia concentration measurement value in order to control the ammonia concentration of the to-be-treated water in the membrane filtration tank such that the ammonia concentration of the to-be-treated water in the membrane filtration tank is brought to the target value. The water treatment control system 300 subtracts the aerobic tank aeration air volume offset value from the aerobic tank aeration air volume control value to thereby calculate the aerobic tank aeration air volume control corrected value. The water treatment control system 300 sets the aerobic tank aeration air volume control corrected value as the aerobic tank aeration air volume of the aerobic tank aeration device. As a result, when the water quality of the sludge water flowed from the inlet 1 into the aerobic tank 2 changes, the aerobic tank aeration air volume in the aerobic tank 2 can be controlled as the aerobic tank aeration air volume in the aerobic tank 2 for maintaining the ammonia concentration of the to-be-treated water in the membrane filtration tank 4 at the membrane filtration tank ammonia concentration target value T is calculated taking into consideration the offset value of the aerobic tank aeration air volume for the ammonia concentration of the to-be-treated water in the aerobic tank 2, before occurrence of a change in the ammonia concentration of the to-be-treated water in the membrane filtration tank 4. Thus, the control for bringing the ammonia concentration of the to-be-treated water in the membrane filtration tank 4 to the membrane filtration tank ammonia concentration target value T can be performed more quickly than the water treatment control system 100 according to the first embodiment. Thus, by taking into consideration the offset value of the aerobic tank aeration air volume, excessive aeration in the aerobic tank 2 can be reduced or prevented, thereby enabling the amount of energy needed for aeration to be reduced more than the water treatment control system 100 according to the first embodiment.

Since the control for bringing the ammonia concentration of the to-be-treated water in the membrane filtration tank 4 to the membrane filtration tank ammonia concentration target value T can be quickly performed, progression of fouling caused by growth of nitrifying bacteria on the separation membrane 5 can be more reduced or prevented than the water treatment control system 100 according to the first embodiment, and can thus reduce operational cost of the water treatment control system.

Third Embodiment

Figure 7:
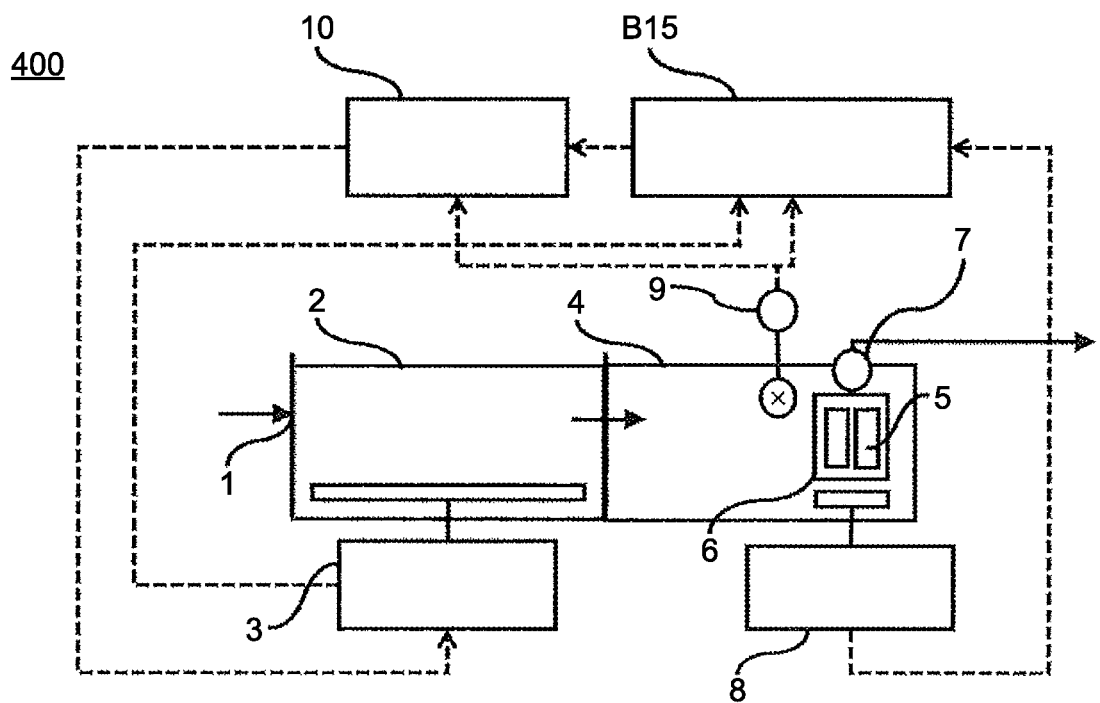
FIG. 7 is a configuration diagram of a water treatment control system according to a third embodiment of the present invention.

A water treatment control system 400 according to a third embodiment of the present invention will now be described with reference to the configuration diagram of FIG. 7. Note that in FIG. 7, like reference characters as in FIG. 1 designate identical or corresponding elements. Thus, a description thereof will be omitted, and a description will be given of portions configured differently from the water treatment control system 100 of the first embodiment.

The water treatment control system 400 according to the third embodiment of the present invention includes an aerobic tank aeration air volume offset calculation device B15, in addition to the water treatment control system 100 according to the first embodiment. Note that the aerobic tank aeration device 3 has a function of measuring the aerobic tank aeration air volume, i.e., the aeration air volume in the aerobic tank 2, and sending the aerobic tank aeration air volume to the aerobic tank aeration air volume offset calculation device B15. The aerobic tank aeration air volume that has been measured is hereinafter referred to as "aerobic tank aeration air volume measurement value Vc". In addition, the membrane surface aeration device 8 has a function of measuring the membrane surface aeration air volume, i.e., the aeration air volume in the membrane filtration tank 4, and sending the membrane surface aeration air volume to the aerobic tank aeration air volume offset calculation device B15.

The membrane surface aeration air volume that has been measured is hereinafter referred to as "membrane surface aeration air volume measurement value Wa". Moreover, the membrane filtration tank measurement instrument 9 measures the membrane filtration tank ammonia concentration measurement value F, which is the ammonia concentration of the to-be-treated water in the membrane filtration tank 4.

The aerobic tank aeration air volume offset calculation device B15 includes, in addition to a central processing unit (CPU), a read-only memory (ROM), a random access memory (RAM), an interface (I/F), an input-output (I/O) port, and the like (neither illustrated). The ROM stores programs executed by the CPU, various constant data, and the like. The programs executed by the CPU can be stored in various types of storage media such as a flexible disk, a CD-ROM, and/or a memory card, and are installed in the ROM from these storage media. The RAM temporarily stores data required for execution of the programs. The I/F sends and receives data with external devices (e.g., the aerobic tank aeration device 3, the membrane surface aeration device 8, the membrane filtration tank measurement instrument 9, etc.). The I/O port inputs and outputs detection signals of various sensors.

The aerobic tank aeration air volume offset calculation device B15 sets the relationship between the aerobic tank aeration air volume and the membrane surface aeration air volume from the membrane filtration tank ammonia concentration measurement value F measured in the membrane filtration tank measurement instrument 9. The aerobic tank aeration air volume offset calculation device B15 calculates an aerobic tank aeration air volume calculation value Vd corresponding to the membrane surface aeration air volume measurement value Wa measured in the membrane surface aeration device 8. The aerobic tank aeration air volume offset calculation device B15 calculates an offset value Ob of the aerobic tank aeration air volume (the offset value hereinafter referred to as "aerobic tank aeration air volume offset value Ob") from the difference between the aerobic tank aeration air volume measurement value Vc measured in the aerobic tank aeration device 3 and the aerobic tank aeration air volume calculation value Vd. The aerobic tank aeration air volume offset calculation device B15 then outputs the aerobic tank aeration air volume offset value Ob to the aerobic tank aeration air volume calculation device 10. Note that a detailed method of calculating the aerobic tank aeration air volume offset value Ob will be described in detail later.

As given by formula (6) below, the aerobic tank aeration air volume calculation device 10 subtracts the aerobic tank aeration air volume offset value Ob calculated in the aerobic tank aeration air volume offset calculation device B15, from the aerobic tank aeration air volume control value Q calculated by control similar to the control in the control flow of the first embodiment (steps 102 to 105 of FIG. 3) to thereby calculate an aerobic tank aeration air volume Xb in the aerobic tank 2. The aerobic tank aeration air volume Xb in the aerobic tank 2 is required to control the ammonia concentration of the to-be-treated water in the membrane filtration tank 4 such that the ammonia concentration of the to-be-treated water in the membrane filtration tank 4 is brought to the membrane filtration tank ammonia concentration target value T. The aerobic tank aeration air volume Xb is hereinafter referred to as "aerobic tank aeration air volume control corrected value Xb"). The aerobic tank aeration air volume calculation device 10 then outputs the aerobic tank aeration air volume control corrected value Xb to the aerobic tank aeration device 3.

(Aerobic tank aeration air volume control value $Xb$)=(Aerobic tank aeration air volume control value $Q$)−(Aerobic tank aeration air volume offset value $Ob$)     (6)

An operation of the water treatment control system 400 according to the third embodiment of the present invention will now be described. Description of operation identical to the operation of the water treatment control system 100 according to the first embodiment of the present invention will be omitted, and only the different part of operation will be described.

In the water treatment control system 400 according to the third embodiment of the present invention, the aeration air volume to be produced by the aerobic tank aeration device 3 is set by the aerobic tank aeration air volume control value Xb. The aerobic tank aeration air volume control corrected value Xb is calculated by subtracting the aerobic tank aeration air volume offset value Ob calculated in the aerobic tank aeration air volume offset calculation device B15, from the aerobic tank aeration air volume control value Q calculated in the aerobic tank aeration air volume calculation device 10.

Figure 8:
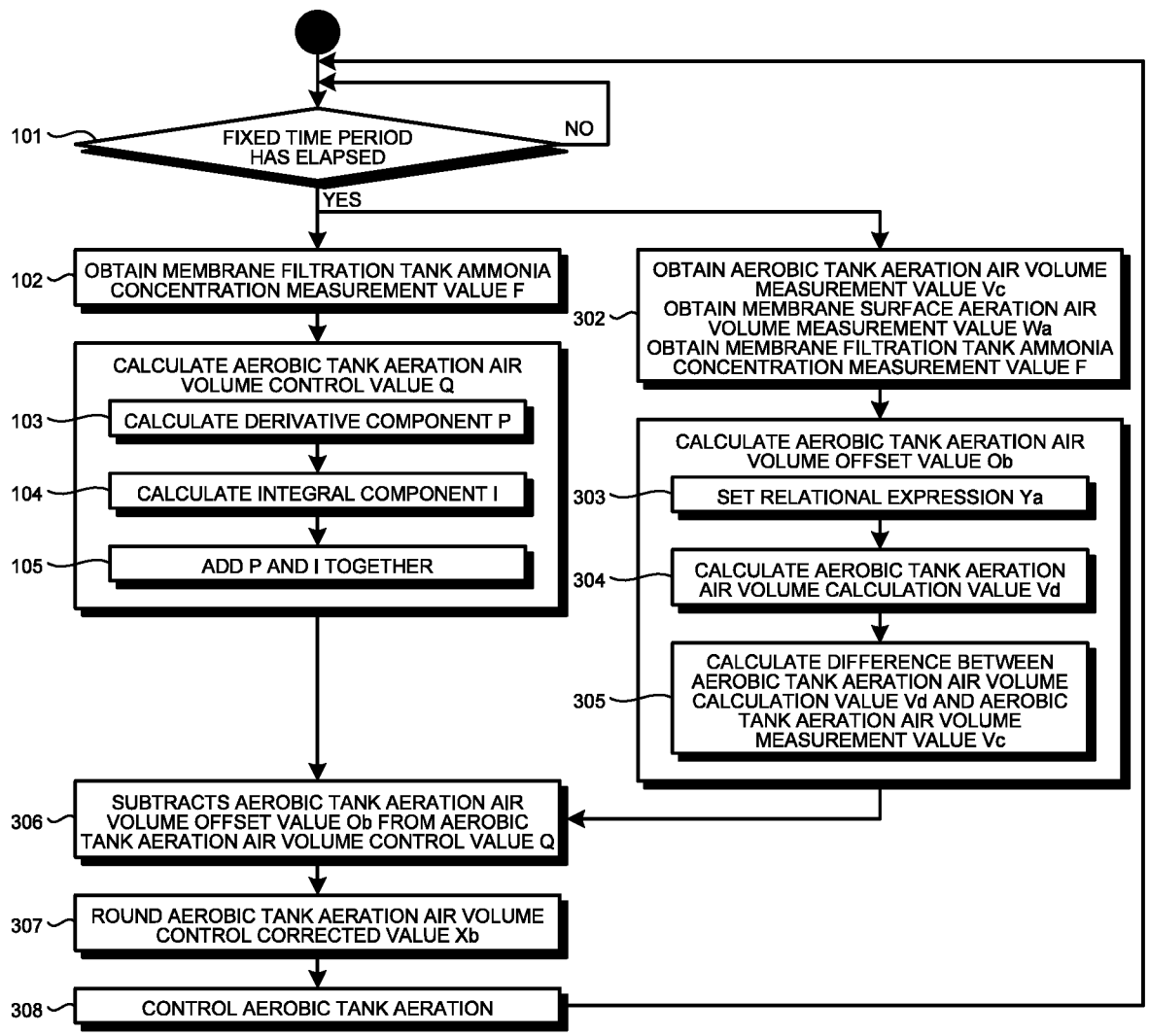
FIG. 8 is a control flow chart according to the third embodiment of the present invention.

A control procedure by the water treatment control system 400 according to the third embodiment of the present invention will now be described with reference to the control flow chart of FIG. 8. Note that only the part different from the control flow of the water treatment control system 100 of the first embodiment will be described. The control is performed at fixed time intervals. The processing at steps 101 to 105 is similar to the corresponding part of the control flow of the first embodiment (steps 101 to 105 of FIG. 3), that is, the aerobic tank aeration air volume calculation device 10 calculates the aerobic tank aeration air volume control value Q. Note that the processing at steps 101 to 105 is performed by the aerobic tank aeration air volume calculation device 10.

The processing at steps 302 to 305 is performed by the aerobic tank aeration air volume offset calculation device B15. At step 302, the aerobic tank aeration air volume offset calculation device B15 obtains the aerobic tank aeration air volume measurement value Vc measured in the aerobic tank aeration device 3, the membrane surface aeration air volume measurement value Wa measured in the membrane surface aeration device 8, and the membrane filtration tank ammonia concentration measurement value F measured in the membrane filtration tank measurement instrument 9.

Figure 9:
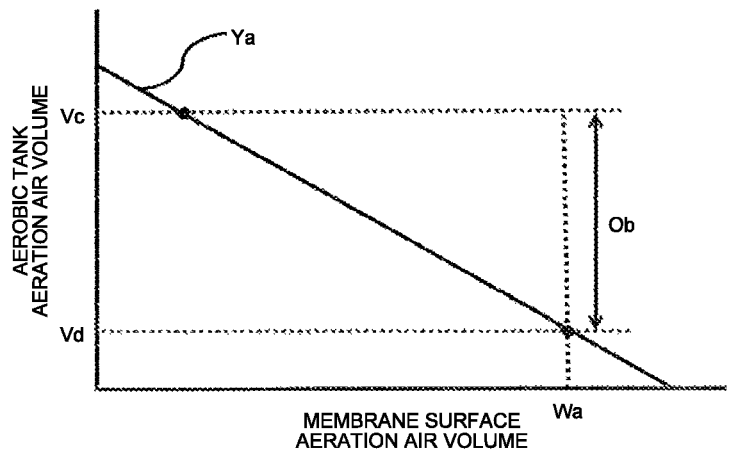
FIG. 9 is a relationship graph of the membrane surface aeration air volume and the aerobic tank aeration air volume according to the third embodiment of the present invention.

The aerobic tank aeration air volume offset calculation device B15 stores a relationship between the membrane surface aeration air volume and the aerobic tank aeration air volume at each ammonia concentration of the to-be-treated water in the membrane filtration tank 4. The relationship between the membrane surface aeration air volume and the aerobic tank aeration air volume illustrated in FIG. 9 is obtained through preliminary measurement. In a case of performing preliminary measurement, the aerobic tank aeration air volume, the ammonia concentration of the to-be-treated water in the membrane filtration tank 4, and the membrane surface aeration air volume are measured in the configuration of FIG. 7 to thereby calculate the relationship of FIG. 9. The ammonia concentration of the sludge water flowed in through the inlet 1 is fixed to an arbitrary value, which is desirably as close to an actual value during operation as possible. The membrane surface aeration air volume is scanned in arbitrary increments or steps over the operational range at a predetermined ammonia concentration of the to-be-treated water in the membrane filtration tank 4 to adjust the aerobic tank aeration air volume to bring the ammonia concentration of the treated water to a target value in each step. It is possible to obtain the relationship between the aerobic tank aeration air volume and the membrane surface aeration air volume as illustrated in FIG. 9, which relationship brings the ammonia concentration of the to-be-treated water in the membrane filtration tank 4 to the membrane filtration tank ammonia concentration target value T in each step as the ammonia concentration of the to-be-treated water in the membrane filtration tank 4 is scanned in arbitrary increments or steps over the actual operational range whenever possible.

At step 303, as illustrated in FIG. 9, the aerobic tank aeration air volume offset calculation device B15 sets, from measured values, a relational expression Ya of the aerobic tank aeration air volume relative to the membrane surface aeration air volume, which expression Ya indicates the relationship between the membrane surface aeration air volume and the aerobic tank aeration air volume at the membrane filtration tank ammonia concentration measurement value F measured in the membrane surface aeration device 8.

At step 304, the aerobic tank aeration air volume offset calculation device B15 calculates the aerobic tank aeration air volume calculation value Vd on the basis of the relational expression Ya of the aerobic tank aeration air volume relative to the membrane surface aeration air volume illustrated in FIG. 9, the expression Ya being set from the measured value data at step 303. The aerobic tank aeration air volume calculation value Vd corresponds to the membrane surface aeration air volume measurement value Wa measured in the membrane surface aeration device 8.

At step 305, as given by formula (7) below, the aerobic tank aeration air volume offset calculation device B15 calculates the difference between the aerobic tank aeration air volume measurement value Vc obtained at step 302 and the aerobic tank aeration air volume calculation value Vd calculated at step 304 to thereby calculate the aerobic tank aeration air volume offset value Ob corresponding to the membrane surface aeration air volume measurement value Wa at the membrane filtration tank ammonia concentration measurement value F.

(Aerobic tank aeration air volume offset value $Ob$)= (Aerobic tank aeration air volume measurement value $Vc$)−(Aerobic tank aeration air volume calculation value $Vd$) (7)

In the case illustrated in FIG. 9, the aerobic tank aeration air volume measurement value Vc is greater than the aerobic tank aeration air volume calculation value Vd corresponding to the membrane surface aeration air volume measurement value Wa at the membrane filtration tank ammonia concentration measurement value F. Thus, in the case of FIG. 9, the aerobic tank aeration air volume offset value Ob is a positive value.

The aerobic tank aeration air volume offset calculation device B15 sends the aerobic tank aeration air volume offset value Ob calculated at step 305 to the aerobic tank aeration air volume calculation device 10.

At step 306, as given by formula (6), the aerobic tank aeration air volume calculation device 10 subtracts the aerobic tank aeration air volume offset value Ob calculated in the aerobic tank aeration air volume offset calculation device B15, from the aerobic tank aeration air volume control value Q calculated at steps 102 to 105 to thereby calculate the aerobic tank aeration air volume control corrected value Xb in the aerobic tank 2. The the aerobic tank aeration air volume control corrected value Xb is required to control the ammonia concentration of the to-be-treated water in the membrane filtration tank 4 such that the ammonia concentration of the to-be-treated water in the membrane filtration tank 4 is brought to the membrane filtration tank ammonia concentration target value T.

At step 307, the aerobic tank aeration air volume calculation device 10 rounds the aerobic tank aeration air volume control corrected value Xb calculated, to an upper or lower limit similarly to the operation of the first embodiment. In the water treatment control system 400 according to the third embodiment uses, a value of the upper limit and a value of the lower limit are, by way of example, 100,000 and 100, respectively ([upper limit]=100,000 and [lower limit]=100).

At step 308, the aerobic tank aeration air volume calculation device 10 sends, to the aerobic tank aeration device 3, the rounded aerobic tank aeration air volume control corrected value Xb that is the finalized control value. The aerobic tank aeration device 3 carries out aeration on the to-be-treated water in the aerobic tank 2 at the aerobic tank aeration air volume control corrected value Xb received. After the processing at step 308, the process returns back to step 101, and the flow is kept waiting until the fixed time period elapses.

The membrane surface aeration performed by the membrane surface aeration device 8 provides the nitrification effect on the to-be-treated water in the membrane filtration tank 4, which effect is a secondary effect. The membrane surface aeration is carried out by the membrane surface aeration device 8 to reduce fouling of the separation membrane 5. When the membrane surface aeration air volume is reduced for the purpose of reducing energy cost for membrane surface aeration in spite of the ammonia concentration of the to-be-treated water in the membrane filtration tank 4 being less than or equal to the membrane filtration tank ammonia concentration target value T, the fouling of the separation membrane 5 will proceed, which will require cleaning of the separation membrane 5.

The water treatment control system 400 according to the third embodiment sets, from the membrane filtration tank ammonia concentration measurement value, a relational expression between the aerobic tank aeration air volume and the membrane surface aeration air volume. The water treatment control system 400 calculates, on the basis of the relational expression, the aerobic tank aeration air volume calculation value corresponding to the membrane surface aeration air volume measurement value. The water treatment control system 400 calculates the difference between the aerobic tank aeration air volume measurement value and the aerobic tank aeration air volume calculation value to thereby calculate the aerobic tank aeration air volume offset value. The water treatment control system 400 subtracts the aerobic tank aeration air volume offset value from the aerobic tank aeration air volume control value calculated on the basis of the membrane filtration tank ammonia concentration measurement value to thereby calculate the aerobic tank aeration air volume control corrected value in order to control the ammonia concentration of the to-be-treated water in the membrane filtration tank such that the ammonia concentration of the to-be-treated water in the membrane filtration tank is brought to the target value. The water treatment control system 400 sets the aerobic tank aeration air volume control corrected value as the aerobic tank aeration air volume of the aerobic tank aeration device. This enables optimum aeration that takes into consideration the digestion by using the membrane surface aeration air volume measurement value. The amount of energy needed for aeration can be reduced more than the water treatment control system 100 according to the first embodiment.

Note that the water treatment control system of each of the first to third embodiments has been described by way of example as using PI control to calculate the aerobic tank aeration air volume control value at steps 102 to 105 in the control procedure, but the control method is not limited to PI control. Instead, a method may be used in which the ammonia concentration and the nitrifying bacteria concentration are estimated according to an activated sludge model (ASM) proposed by International Water Association (IWA), and the aeration air volumes for the aerobic tank 2 and for the separation membrane 5 are controlled depending on the estimated values.

Note that the present invention is not limited to the water treatment control systems described in the first to third embodiments, but portions of different embodiments may be combined with each other in any form, and a portion of these embodiments may be modified and/or omitted as appropriate without departing from the scope of the invention.

The present invention will be described in detail below using an example. Note that the present invention is not limited to the following example.

EXAMPLE 1

A comparison was made between operation results of simulation on a water treatment control system, of a type similar to the conventional type, that controls the aeration air volume on the basis of the ammonia concentration of the to-be-treated water in the aerobic tank, and on the water treatment control system 100 according to the first embodiment illustrated in FIG. 1. An activated sludge model (ASM) proposed by International Water Association (IWA) was applied to the simulation.

The conventional-type water treatment control system and the water treatment control system 100 according to the first embodiment used for the simulation each had a dual tank structure including an aerobic tank and a membrane filtration tank. The aerobic tank had a tank capacity of 12,380 m$^3$, the membrane filtration tank had a tank capacity of 6,163 m$^3$, and the inflow water had a constant flow rate of 2,200 m$^3$/Hr. The inflow water had an ammonia concentration of 8.0 gNH$_3$-N/m$^3$, and flowed into the aerobic tank. The to-be-treated water in the aerobic tank and the to-be-treated water in the membrane filtration tank each had an initial ammonia concentration of 0.5 gNH$_3$-N/m$^3$.

The conventional-type water treatment control system controls the aeration air volume in the aerobic tank such that the ammonia concentration of the to-be-treated water in the aerobic tank is brought to the aerobic tank ammonia concentration target value. In contrast, the water treatment control system 100 according to the first embodiment of the present invention controls the aeration air volume in the aerobic tank such that the ammonia concentration of the to-be-treated water in the membrane filtration tank is brought to the membrane filtration tank ammonia concentration target value. The conventional-type water treatment control system performed control for bringing the ammonia concentration of the to-be-treated water in the aerobic tank to the aerobic tank ammonia concentration target value, which was 1.0 gNH$_3$-N/m$^3$, while the water treatment control system 100 according to the first embodiment of the present invention performed control for bringing the ammonia concentration of the to-be-treated water in the membrane filtration tank to the membrane filtration tank ammonia concentration target value, which was 1.0 gNH$_3$-N/m$^3$.

Figure 10:
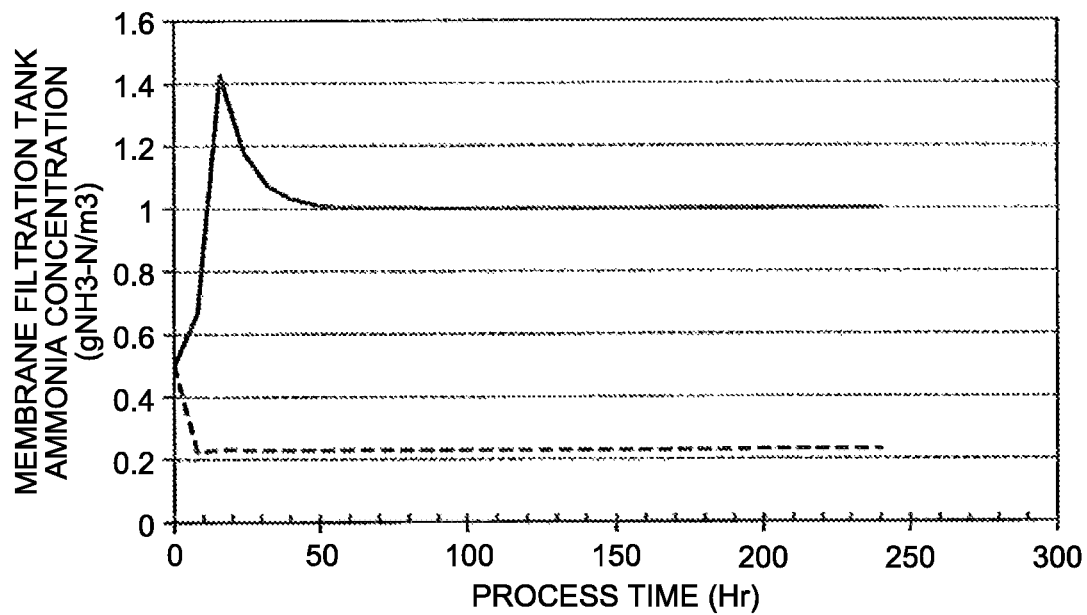
FIG. 10 is a diagram illustrating simulation results of Example 1.
Figure 11:
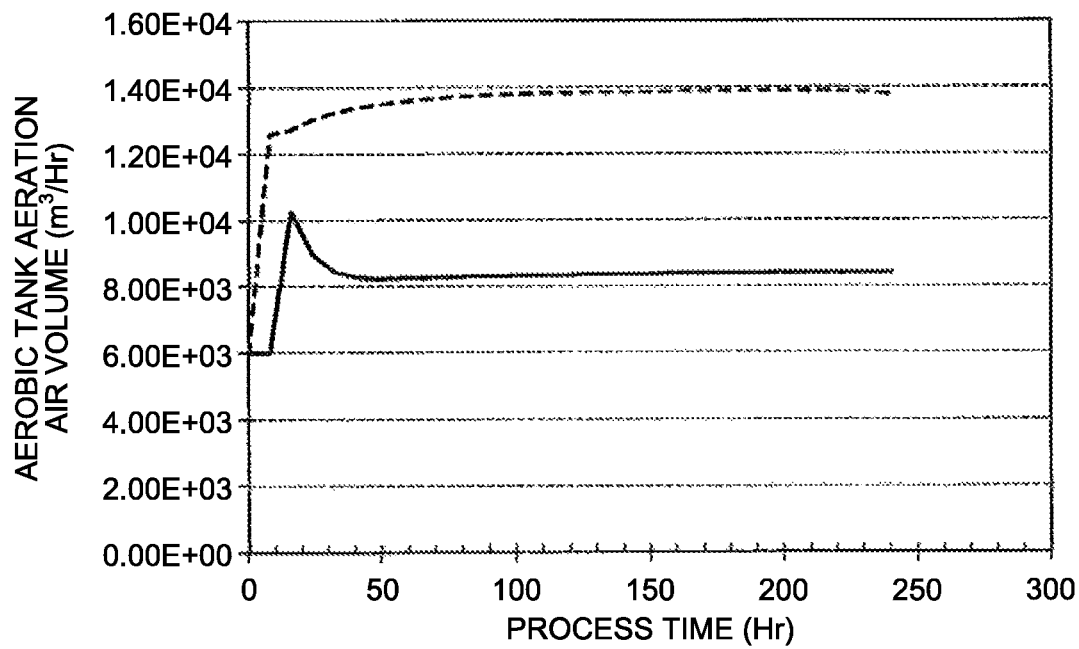
FIG. 11 is a diagram illustrating simulation results of Example 1.

Results of 10-day operation simulation performed on the conventional-type water treatment control system and on the water treatment control system 100 according to the first embodiment of the present invention are illustrated in FIGS. 10 and 11. The results of simulation of the conventional-type water treatment control system are each illustrated by a dashed line, and the simulation results of the water treatment control system 100 according to the first embodiment of the present invention are each illustrated by a solid line.

In FIG. 10, the vertical axis represents the ammonia concentration of the to-be-treated water in the membrane filtration tank. The water treatment control system 100 according to the first embodiment of the present invention controls the ammonia concentration of the to-be-treated water in the membrane filtration tank such that the ammonia concentration of the to-be-treated water in the membrane filtration tank is brought to 1.0 gNH$_3$-N/m$^3$ that is the membrane filtration tank ammonia concentration target value. In contrast, the conventional-type water treatment control system controls the ammonia concentration in the aerobic tank such that the ammonia concentration in the aerobic tank is brought to 1.0 gNH$_3$-N/m$^3$ that is the aerobic tank ammonia concentration target value. The to-be-treated water flowed from the aerobic tank into the membrane filtration tank is nitrified through membrane surface aeration in the membrane filtration tank, such that the to-be-treated water in the membrane filtration tank has an ammonia concentration of 0.2 gNH$_3$-N/m$^3$. Under the simulation conditions of Example 1, the ammonia concentration of the to-be-treated water in the membrane filtration tank, which is 1.0 gNH$_3$-N/m$^3$, is sufficiently acceptable, and it is seen that the conventional-type water treatment control system has an excessively high aeration air volume in the aerobic tank.

FIG. 11 illustrates the aerobic tank aeration air volume in the aerobic tank. The aerobic tank aeration air volume of the conventional-type water treatment control system converges at about 14,000 m$^3$/Hr. In contrast, the aerobic tank aeration air volume of the water treatment control system 100 according to the first embodiment of the present invention converges at about 8,000 m$^3$/Hr.

Accordingly, use of the water treatment control system 100 according to the first embodiment of the present invention can reduce the aerobic tank aeration air volume by about 40% as compared to when the conventional-type water treatment control system is used.

REFERENCE SIGNS LIST 1 inlet; 2 aerobic tank; 3 aerobic tank aeration device; 4 membrane filtration tank; 5 separation membrane; 6 membrane filtration device; 7 treated-water discharge device; 8 membrane surface aeration device; 9 membrane filtration tank measurement instrument; 10 aerobic tank aeration air volume calculation device; 13 aerobic tank measurement instrument; A14 aerobic tank aeration vessel air volume offset calculation device B15; 15 aerobic tank aeration vessel air volume offset calculation device; 100, 200, 300, 400 water treatment control system.

The invention claimed is:
1. A water treatment control system comprising:
an aerobic tank in which aerobic treatment is carried out;
an aerobic tank aerator to aerate to-be-treated water in the aerobic tank and measure an aerobic tank aeration air volume in the aerobic tank, as an aerobic tank aeration air volume measurement value;

a membrane filtration tank including a separation membrane to filter the to-be-treated water treated in the aerobic tank;

a membrane filtration tank measurement instrument to measure an ammonia concentration of the to-be-treated water in the membrane filtration tank, as a membrane filtration tank ammonia concentration measurement value;

an aerobic tank aeration air volume calculator to set an aerobic tank aeration air volume of the aerobic tank aerator on a basis of the membrane filtration tank ammonia concentration measurement value;

an aerobic tank measurement instrument to measure an ammonia concentration of the to-be-treated water in the aerobic tank, as an aerobic tank ammonia concentration measurement value; and an aerobic tank aeration air volume offset calculator to calculate an aerobic tank aeration air volume offset value on the basis of the aerobic tank ammonia concentration measurement value and the aerobic tank aeration air volume measurement value, wherein to control the ammonia concentration of the to-be-treated water in the membrane filtration tank such that the ammonia concentration of the to-be-treated water in the membrane filtration tank becomes a target value, the water treatment control system calculates an aerobic tank aeration air volume control value on the basis of the membrane filtration tank ammonia concentration measurement value, subtracts the aerobic tank aeration air volume offset value from the aerobic tank aeration air volume control value to thereby calculate an aerobic tank aeration air volume control corrected value, and sets the aerobic tank aeration air volume control corrected value as the aerobic tank aeration air volume of the aerobic tank aerator.

2. The water treatment control system according to claim 1, wherein an aerobic tank aeration air volume corresponding to the aerobic tank ammonia concentration measurement value is calculated as an aerobic tank aeration air volume calculation value on the basis of a relationship obtained by measurement of the aerobic tank aeration air volume in the aerobic tank and the aerobic tank ammonia concentration, and the aerobic tank aeration air volume offset calculator subtracts the aerobic tank aeration air volume calculation value from the aerobic tank aeration air volume measurement value to thereby calculate the aerobic tank aeration air volume offset value.

3. A water treatment control system comprising:

an aerobic tank in which aerobic treatment is carried out;

an aerobic tank aerator to aerate to-be-treated water in the aerobic tank and measure an aerobic tank aeration air volume in the aerobic tank, as an aerobic tank aeration air volume measurement value;

a membrane filtration tank including a separation membrane to filter the to-be-treated water treated in the aerobic tank;

a membrane filtration tank measurement instrument to measure an ammonia concentration of the to-be-treated water in the membrane filtration tank, as a membrane filtration tank ammonia concentration measurement value;

an aerobic tank aeration air volume calculator to set an aerobic tank aeration air volume of the aerobic tank aerator on a basis of the membrane filtration tank ammonia concentration measurement value;

a membrane surface aerator to carry out membrane surface aeration on the separation membrane, and obtain an aeration air volume in the membrane filtration tank, as a membrane surface aeration air volume measurement value; and an aerobic tank aeration air volume offset calculator to: set, on the basis of measured membrane filtration tank ammonia concentration values, a relationship of the aerobic tank aeration air volume relative to a membrane surface aeration air volume at the membrane filtration tank ammonia concentration measurement value, as a relational expression of the aerobic tank aeration air volume relative to the membrane surface aeration air volume; calculate, on the basis of the relational expression, an aerobic tank aeration air volume corresponding to the membrane surface aeration air volume measurement value, as an aerobic tank aeration air volume calculation value;

and subtract the aerobic tank aeration air volume calculation value from the aerobic tank aeration air volume measurement value to thereby calculate an aerobic tank aeration air volume offset value, wherein to control the ammonia concentration of the to-be-treated water in the membrane filtration tank such that the ammonia concentration becomes a target value, the water treatment control system subtracts the aerobic tank aeration air volume offset value from an aerobic tank aeration air volume control value calculated on the basis of the membrane filtration tank ammonia concentration measurement value to thereby calculate an aerobic tank aeration air volume control corrected value, and sets the aerobic tank aeration air volume control corrected value as the aerobic tank aeration air volume of the aerobic tank aerator.

* * * * *